United States Patent [19]
Ragsdale et al.

[11] 3,943,285
[45] Mar. 9, 1976

[54] MULTIPLEXED DATA MODEM

[75] Inventors: Robert Gordon Ragsdale, Hollywood; Henry Howard Parrish, Hialeah, both of Fla.

[73] Assignee: Milgo Electronic Corporation, Miami, Fla.

[22] Filed: May 10, 1973

[21] Appl. No.: 359,186

[52] U.S. Cl. ................................................. 178/67
[51] Int. Cl.² ........................................ H04L 27/24
[58] Field of Search .................. 178/66, 67, 68, 88; 325/30, 38 R, 45, 163, 320

[56] References Cited
UNITED STATES PATENTS

| | | | |
|---|---|---|---|
| 3,553,368 | 1/1971 | Rudolph | 178/67 |
| 3,619,503 | 11/1971 | Ragsdale | 178/67 X |
| 3,706,945 | 12/1972 | Yanagidaira et al. | 178/67 |
| 3,758,870 | 9/1973 | Schmitt et al. | 178/66 R X |

*Primary Examiner*—Benedict V. Safourek
*Assistant Examiner*—Aristotelis M. Psitos
*Attorney, Agent, or Firm*—Jackson & Jones Law Corporation

[57] ABSTRACT

A data modem that operates to permit the concurrent high speed transmission/reception of digital data over two independent data links or systems, is disclosed. Data bits concurrently applied to a transmitting modem from two independent data sources are interlaced to form a stream of data bits that are effectively grouped as data words to be differentially phase modulated. Modulated data may be transmitted over ordinary voice grade telephone lines to a distant receiver modem at effectively twice the bit rate of the individual data sources. Successive groups of six interlaced data bits are divided into two groups of three bits which are uniquely identified by having a selected phase angle added to or subtracted from the differential phase angle for alternate groups of three bits. The selectively added phase angle is detected at a receiving modem to identify the respective groups of three bits and thereby permit accurate distribution of demodulated data bits to the respective data utilization terminals corresponding to the two data sources.

23 Claims, 9 Drawing Figures

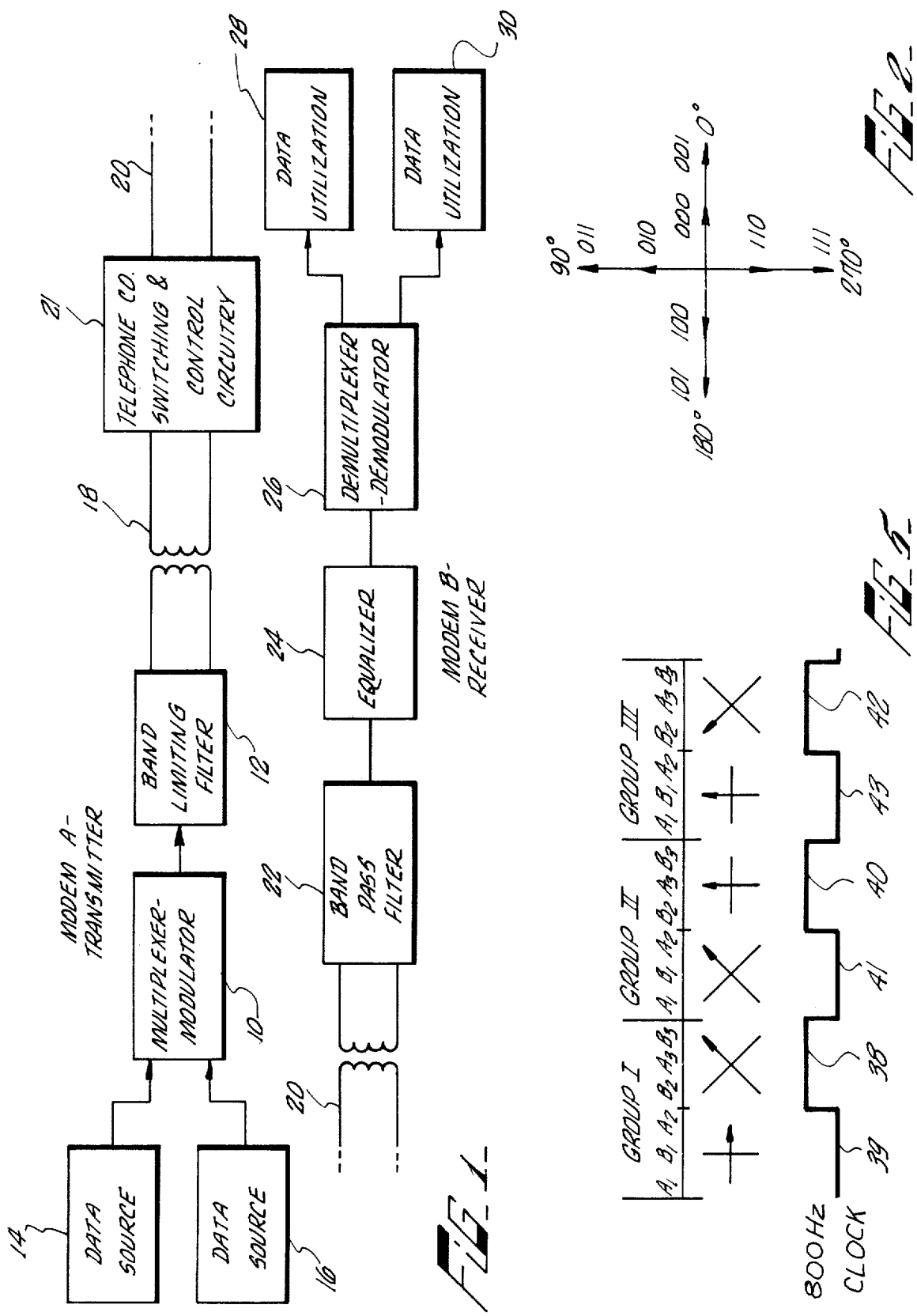

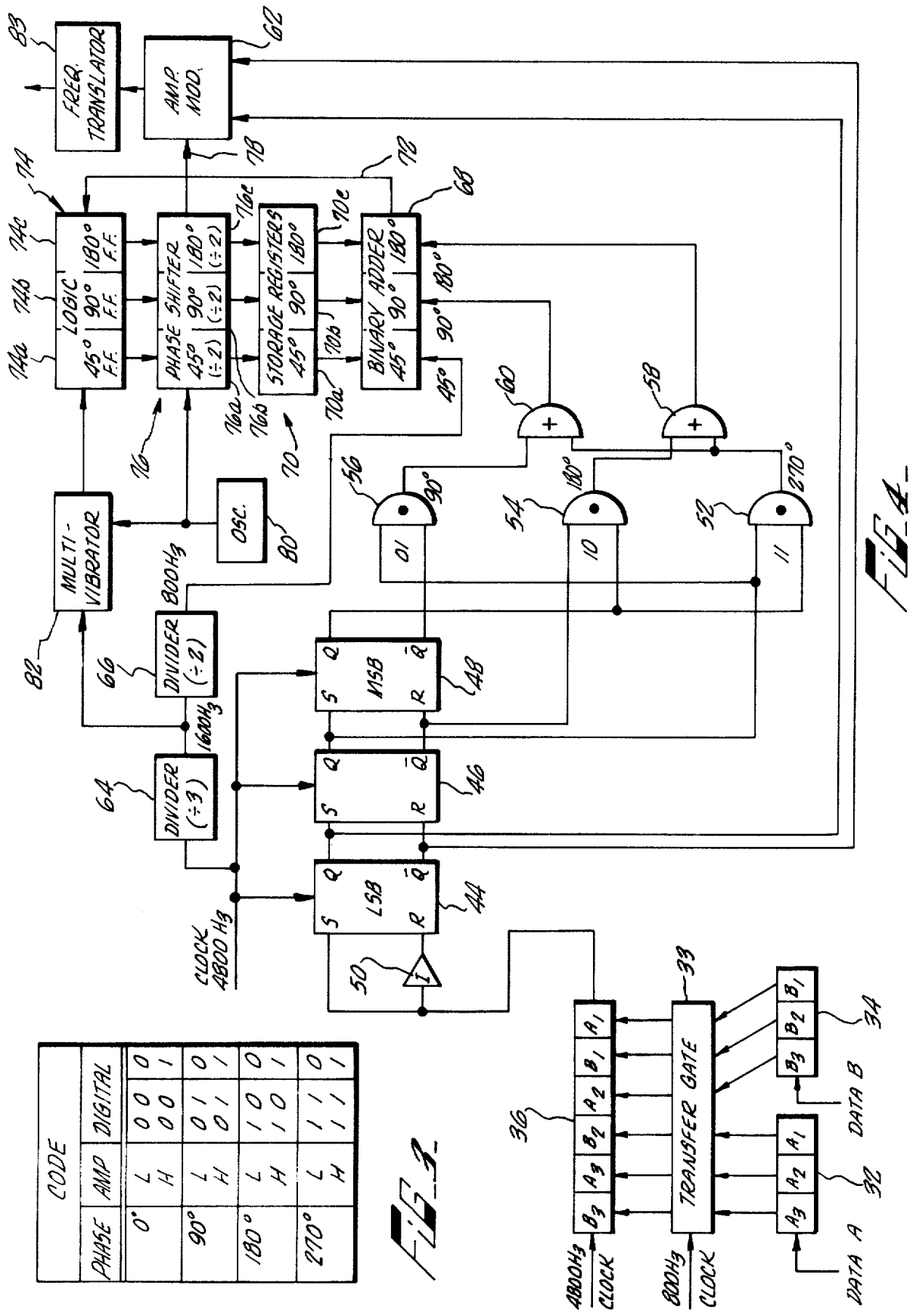

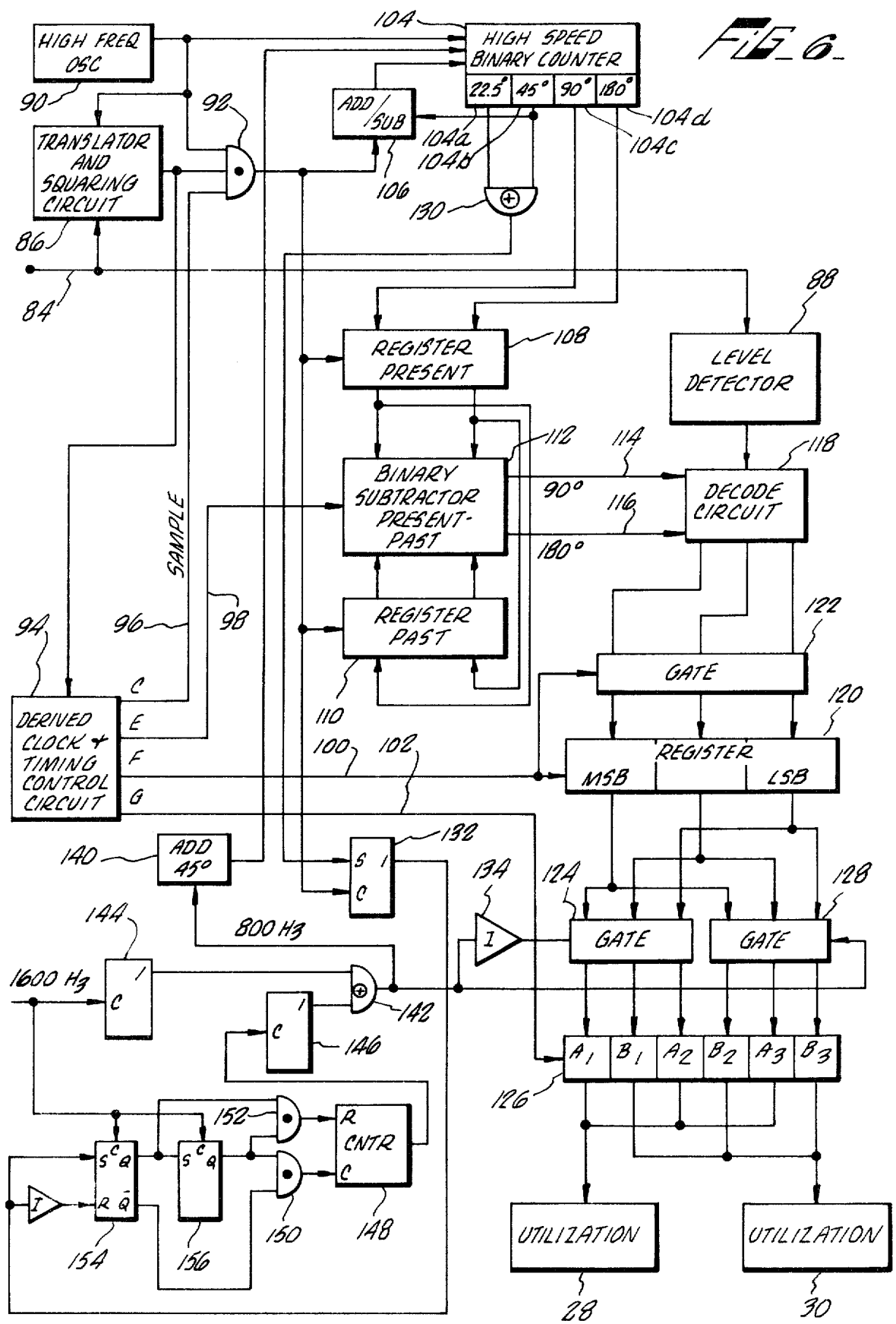
FIG_6

MULTIPLEXED DATA MODEM

BACKGROUND OF THE INVENTION

1. Field of the Invention

This invention generally relates to the high speed transmission of digital data over unconditioned voice grade telephone lines connecting distant data terminals. More specifically, this invention concerns data modems for enabling two independent data systems to be concurrently operated and serviced by a single pair of modems.

2. Description of the Prior Art

The high speed transmission of digital data between physically distant data terminals is today commonplace. Modern modems or data sets used for digital data transmission now permit such data to be transmitted over unconditioned voice grade telephone lines.

Typically, a modem is required to be used at each data terminal to modulate data to be transmitted from a transmitting terminal and demodulate received data at a receiving terminal. Each modem hence includes two basic portions, a transmitter and a receiver. The transmitter generally operates to accept digital signals and convert these digital signals to modulated analog signals for transmission over the telephone lines. The receiver operates to accept the modulated analog signals and reconvert, or otherwise recover, the originally transmitted digital signals. Both the transmitter and the receiver may be encased within a common container to share a power supply and other general purpose components such as a clock source, etc. However, since the transmitter and receiver are functionally independent and would be both functioning only during full-duplex operation, each may be separately contained.

An assortment of modulation techniques have been used by different modem manufacturers to successfully accomplish the desired data transmission. Differential phase modulation is one such technique that has been used to compensate for difficulties attendant to, and thereby permit, the use of unconditioned voice grade telephone lines. An extensive and detailed description of such differential phase modulation as applied to modems is included in U.S. Pat. No. 3,524,023, U.S. Pat. No. 3,590,381 and U.S. Pat. No. 3,643,023.

As is well known, digital data transmission may occur at any of several bit rates. Conventional modems are available to accommodate data rates ranging from below 300 bits per second to as high as 9600 bits per second. Some modems are adapted to operate at several different data rates, any one of which may be selected for a particular operation. Other modems are designed for operation at a single data rate that is compatible with other components of a data system. For example, where data sources capable of data rates of 2400 bits per second are used, a modem designed for that rate may be used. Updating of a data system to operate at a higher speed such as at 4800 bits per second may typically require a change or modification of the data sources as well as the modems. Needless to point out, the cost of a high speed modem is significantly higher than lower speed modems. For example, a modem that operates at a data rate of 4800 bits per second may have a cost that is greater than three times the cost of a modem that operates at 2400 bits per second.

As may now be readily appreciated, two complete data systems would require the use of four modems, a pair of each data system. Similarly, two complete sets of telephone lines would be required. Obviously, if two such independent data systems are able to concurrently employ a single pair of modems, a vast savings of both cost and equipment requirements would result, since certain requirements would be halved, i.e., only one pair of modems and one set of telephone lines would be required.

Accordingly, it is the intention of the present invention to provide a multiplexed data modem which will concurrently accommodate two independent data systems and thereby substantially reduce the normally associated equipment requirements and attendant costs.

SUMMARY OF THE INVENTION

Briefly described, the present invention involves an improved data modem that permits concurrent operation of two independent data systems.

More particularly, the subject multiplexed data modem is adapted to serve two independent data systems connected by a single set of telephone lines to allow concurrent transmission and/or reception of data. The subject modem includes a transmitter having a modulator for differentially phase modulating data bits that are concurrently applied thereto for transmission. The modem also includes a receiver having a demodulator for demodulating received signals for distribution to a pair of separate data terminals. Multiplexing at the transmitter is accomplished by interlacing successive data bits applied from each of the two data sources to continually form successive groups of six bits each having two half-groups of three data bits. Such three bit half-groups are uniquely identified as either a first or second half-group by having a selected modifying phase angle periodically added to, or subtracted from, the differential phase angle of modulated data signals. The added or subtracted modifying phase angle is duplicated at a receiving modem to maintain synchronous operation and thereby permit demodulation of received data. Duplication of the added or subtracted modifying phase angle at the receiver also enables identification of the first and second half-groups to effect accurate distribution of the individual data bits to the correct one of the two receiving data terminals.

The objects and many attendant advantages of the invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

FIG. 1 is a schematic block diagram illustrating the general relationship of two independent data systems which are adapted for concurrent operation by employment of multiplexed data modems, in accordance with the present invention.

FIG. 2 is a graphic diagram that illustrates an exemplary eight-level modulation scheme that may be used in conjunction with the present invention.

FIG. 3 is a tabular presentation of an exemplary eight-level coding scheme that is useful in conjunction with the present invention.

FIG. 4 is a schematic block diagram illustrating an embodiment of a multiplexer-modulator that may be used in conjunction with a modem in accordance with the present invention.

FIG. 5 is a graphic diagram that illustrates the relationship of successively alternating three bit half-groups that are involved in the operation of the present invention.

FIG. 6 is a schematic block diagram illustrating an embodiment of a multiplexed-demodulator that may be used in conjunction with a modem in accordance with the present invention.

DESCRIPTION OF THE PREFERRED EMBODIMENT

Figure 7:
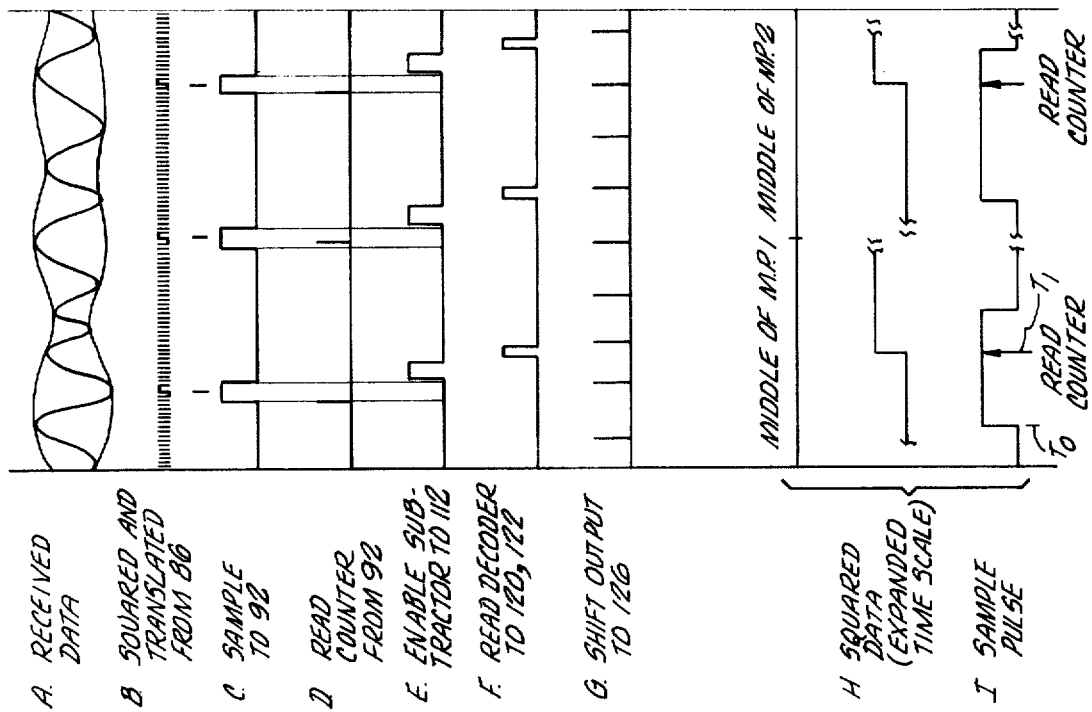
FIG. 7 is a graphic diagram illustrating a number of waveforms that are useful in understanding the operation of the circuitry of FIG. 6.

Referring to the drawings, FIG. 1 illustrates the essential elements of a pair of multiplexed modems that are operationally interconnected to service two independent data systems in accordance with the present invention. For purposes of simplicity, the transmitter portion of a first modem A and the receiver portion of a second modem B are illustrated and described hereinbelow. It is to be understood that in practice the modems A and B each would include both a receiver circuit and a transmitter circuit.

The transmitter portion of a modem in accordance with the present invention essentially includes a multiplexer-modulator 10 and a band limiting filter 12. Data to be transmitted from a pair of data sources 14 and 16 is applied to the modulator 10 for multiplexing and differential phase modulation. The modulated data is then applied through the band limiting filter 12 to conventional unconditioned voice grade telephone lines 18 for transmission to an intended receiving terminal such as the receiver of modem B.

As shown, the telephone lines 18 serving a transmitter may be connected to telephone lines 20 serving an intended receiving terminal via extensive switching and control circuitry 21 that may be owned and/or operated by telephone companies.

The receiver portion of a modem may essentially include a band pass filter 22, an equalizer 24 and a demultiplexer-demodulator 26 which operates to demultiplex and demodulate the modulated signals received from the transmitting data terminal. Any frequency translation of transmitted and received signals is also hereinafter described in conjunction with the modulator 10 and the demodulator 26. Demodulated data is distributed to each of two data utilization devices 28 and 30 which may respectively correspond to the data sources 14 and 16.

The data sources 14 and 16 may represent digital data encoders, or the like. Similarly, the data utilization devices 28 and 30 may represent digital data decoders. As is well known, such digital data encoders and decoders are frequently used in conjunction with modems to provide data in a suitable digital format, i.e., NRZ, split-phase-mark, etc. The present invention anticipates the use of any of the conventional types of encoders and/or decoders that are well known in the art.

The equalizer 24, as is conventional, serves to neutralize or counteract the effects of amplitude attenuation and/or signal distortion caused by envelope delay. Although the equalizer 24 is illustrated as being situated at the receiver of the modem B, the equalizer 24 may be readily connected at the transmitter of the modem A in any manner that is well known in the art. Any of the conventional and well known types of equalizers may be used in conjunction with the present invention. A detailed description of equalizers and modems may be obtained by reference to "Data Modem Selection and Evaluation Guide", by Vess V. Vilips, Artech House, Inc., copyright 1972, or by reference to any other available text.

The filters 12 and 22 may be band limited or band pass filters of any well known type which are designed to either operate as two separate filters or in combination as a composite filter to provide a desired composite frequency response.

The modulator 10 and the demodulator 26 may each be adapted for differential phase modulation. In the present invention, an eight-level modulator scheme is used. As is well known, such eight-level modulation schemes may commonly involve purely phase modulation using eight different phases, or a combination of phase and amplitude modulation such as by using four phases and two amplitude levels. Clearly, such eight-level modulation schemes will accommodate each of eight different conditions which may be represented by the eight different binary words that are possible to be formed using three binary bits.

The graphic diagram of FIG. 2 illustrates an exemplary coding scheme involving the use of four-phases and two amplitude levels. As shown, each of eight different three-bit binary words have been correlated with a particular phase and amplitude level. Table I presented hereinbelow and as FIG. 3 of the drawings presents in a tabular format the correlative phase and amplitude relationships between the respective eight three-bit binary words illustrated by FIG. 2.

TABLE I

| EXEMPLARY EIGHT-LEVEL MODULATION USING FOUR PHASES AND TWO AMPLITUDES | | |
|---|---|---|
| Binary Word | Differential Phase Angle | Amplitude |
| 000 | 0° | low |
| 001 | 0° | high |
| 010 | 90° | low |
| 011 | 90° | high |
| 100 | 180° | low |
| 101 | 180° | high |
| 110 | 270° | low |
| 111 | 270° | high |

It is to be noted that any other conventional coding scheme may be used instead of that which is exemplified by Table I.

As is well known, the phase angles that are discussed with respect to differential phase modulation constitute the angular difference between the phases of consecutively received signals. Accordingly, the phase of the last previously received signal must be known in order to demodulate received signals. As an example, if the last previously received signal has a phase angle of 90°, and the phase angle of the next received signal is 270°, a differential phase angle of 180° would be involved for purposes of differential phase modulation. Referring to the exemplary code presented by Table I, the 180° differential phase angle would correspond to one of the binary words or bit groupings 100 or 101. The amplitude level of the received signal would be definitive of which of the binary words had been received. A high amplitude level (designated by an "H" in the chart of FIG. 3) would identify the binary word as 101 while a low amplitude level (designated by a "L") would identify the binary word 100. A detailed description and discussion of prior art differential phase modulators and demodulators may be found by reference to any or all of the earlier mentioned patents.

Referring now to FIG. 4, a multiplexer-modulator 10 suitable for use with the subject invention is illustrated. It may be assumed that digital data is provided from the sources 14 and 16 at a data rate of 2400 bits per second. For purposes of identification, successive groups of three data bits from the data source 14 may be referred to as bits $A_1$, $A_2$ and $A_3$. Similarly, successive groups of three data bits from the data source 16 may be referred to as $B_1$, $B_2$ and $B_3$. In both instances, the numerical subscripts are used to denote the order of occurrence, i.e., bit $B_1$ occurs earlier in time than $B_2$, etc.

As shown by FIG. 4, data bits from the sources 14 and 16 are serially applied to a pair of tapped shift registers 32 and 34, respectively. Each of the shift registers 32 and 34 may be designed to have three stages to accommodate three successively applied data bits. As will become clear hereinafter, greater numbers of bits may be transferred from suitable shift registers. The shift registers 32 and 34 are each tapped to permit the three data bits stored by the respective stages of the shift registers to be outputted, sampled, or the like, at regular time intervals. For example, consecutive groups of three successive bits may be outputted at a rate of 800 cycles per second via and under the control of a transfer gate 33. The transfer gate 33 may be replaced by a suitable alternative such as a multibit buffer register.

The data bits from the shift registers 32 and 34 are transferred via the gate 33 to a six-bit shift register 36. As shown by FIG. 4, the bits may be interleaved or interlaced in the order shown, i.e., $A_1$, $B_1$, $A_2$, $B_2$, $A_3$, $B_3$. Such interlacing of bits is an expedient procedure that may be replaced by any other arrangement of bits. However, it is important for modulation purposes that there is formed at least two groups of three bits for compatibility with the modulation procedure.

When data bits are concurrently provided from a pair of data sources 14 and 16 at a data rate of 2400 bits per second, it is clear that the bits may then be outputted from the shift register 36 at an effective data rate of 4800 bits per second.

The shift registers 32, 34 and 36 may be of any conventional configuration which are adapted to be appropriately clocked by the application of clock pulses (not shown) to perform the above described procedure.

Referring to the graphic diagram of FIG. 5, three successive groups of six bits are illustrated. Each group of bits is shown to be in the earlier described temporal sequence. In accordance with the present invention, each such group of six bits may be treated as two half-groups of three bits each. Such three bit half-groups would be compatible with the earlier described three bit differential modulation coding scheme. As shown, the first half-groups include the bits $A_1$, $B_1$, $A_2$, and the second half-groups include the bits $B_2$, $A_3$, $B_3$. Obviously, demultiplexing and demodulation of transmitted data at a receiver requires that each half-group be identifiable and distinguishable as a first or second half-group. Such identification is accomplished in accordance with a preferred embodiment of the present invention by regularly modifying the differential phase angle corresponding to each second half-group as it occurs. Such modification may take the form of a phase angle additon or subtraction. For example, a 45° angle or other angle may be added or substracted. Obviously, such 45° angle modification when selected may be effectively accomplished by both the addition and subtraction of selected angles, i.e., adding a 22.5° phase angle and subtracting a 157.5° angle. For purposes of the following description, a 45° angle is used.

The required 45° phase angle addition would occur at a frequency of 800Hz.

Such phase addition is graphically illustrated by the crosslike replicas of the diagram shown in FIG. 2 that appear below the groups of bits symbolized by corresponding letters. Proceeding from left to right, the successively repositioned arrowheads are intended to show the 45° phase angle additions that occur with each successive second half-group.

As shown, the 45° phase angle that is added for the second half-group of group I is maintained until the last bit of the first half-group of group II has been, in effect, read from the shift register 36. A 45° phase angle would next be added for the second half-group of group II and would continue for the duration of the first half-group of group III. Such addition of a 45° phase angle would be routinely carried out at the occurrence of each succeeding second half-group. In short, a 45° phase angle is added for every other three bit group, which in this case has been chosen to be successive second half-groups. Needless to point out the added phase angle may be used as well to routinely alter the phase of the first half-groups.

As earlier mentioned, the desired 45° phase angle additions would be carried out at a frequency of 800Hz in the present case wherein two data sources which provide data at 2400 bits per second are involved. As shown by FIG. 5, an 800Hz square wave signal that is synchronized with the half-groups of three bits may be used to continually effect the timely addition of the 45° phase angle that is added with each second half-group. Each of the pulses 38, 40 and 42 would have a pulse width corresponding to a baud period or the time period necessary to accommodate three data bits included in each half-group. Similarly, the interpulse periods 39, 41 and 43 would correspond to a baud period or the time duration of a three bit half-group and would therefore be equal in time duration to the pulses 38, 40 and 42, etc.

It is to be noted at this juncture that the 45° phase angles are added to whatever differential phase angle corresponds to the combination of three data bits being transmitted. For example, if the data bits $B_2$, $A_3$ and $B_3$ in the second half-group of group I were 101, respectively, the corresponding differential phase angle would be 180°. The added 45° phase angle would then result in a modulation phase angle of 225°. It is to be noted that certain well known transmission techniques may be used which further alter the actual phase angle of transmitted signals by an accounted for amount without affecting the correspondence between the chosen three bit code and related differential phase angles.

Referring once again to FIG. 4, the multiplexed data bits provided from the shift register 36 may simply be differentially phase modulated for transmission in accordance with a standard technique such as is disclosed in the above-referenced patents. As shown, a suitable circuit for carrying out the desired phase modulation may include three flip-flop circuits 44, 46 and 48 which are connected in series and to which data bits are applied. As shown, data bits are simultaneously applied to both input terminals of the flip-flop circuit 44. An inverter circuit 50 is used in conjunction with the reset(R) input of the flip-flop circuit 44 such that a "true" or "1" binary bit will cause the flip-flop to become "set" and a "false" or "0" binary bit will cause the flip-flop circuit 44 to become "reset". As may be appreciated, three successive bits such as $A_1$, $B_1$ and $A_2$ may be respectively accommodated by the flip-flops 48, 46 and 44 concurrently as such bits are received from the shift register 36. The flip-flop circuits 44, 46 and 48 would be clocked by a 4800Hz clock signal from an appropriate source (not shown) to accommodate the 4800 bits per second output rate of the shift register 36.

Sampling the contents of the shift register 44, 46 and 48 at time intervals corresponding to a 1600 bits per second data rate and in synchronism with the half-groups permits the desired groups of data bits to be detected or read for modulation purposes. Accordingly, the data bits $A_1$, $B_1$ and $A_2$ or the data bits $B_2$, $A_3$ and $B_3$ would be stored by the respective flip-flop circuits 48, 46 and 44, when the contents thereof are sampled for modulation. It is to be noted that if the order of the bits is not as exemplified by FIG. 5, then the contents of the flip-flop circuits 44, 46 and 48 would be something different and in accordance with whatever order of bits is used.

The contents of the flip-flop circuits 46 and 48 are applied to a plurality of logic gates for the purpose of developing phase angle signals in accordance with the exemplary code described by Table I and FIG. 3. The contents of the flip-flop circuit 48 corresponds to the most significant bit (MSB) of the three bit binary words contained by the flip-flop circuits 44, 46 and 48. The "set" output of the flip-flop circuit 48 is connected as an input to a pair of AND gates 52 and 54. The "reset" output of the flip-flop 48 is connected as an input to a third AND gate 56. Similarly, the "set" output of the flip-flop 46 is connected as an input to the AND gates 52 and 56 while the "reset" output of the flip-flip 46 is connected as an input to the AND gate 54. As a result, the AND gate 56 will be coded for the binary word 01 corresponding to a 90° angle by receiving input signals at both input terminals whenever a "0" bit and a "1" bit are respectively contained by the flip-flop circuits 48 and 46. Similarly, the AND gate 54 will be coded for the binary word 10 corresponding to a 180° angle by receiving signals at both input terminals whenever a "1" bit and a "0" bit are respectively contained by the flip-flop circuits 48 and 46. The AND gate 52 will be coded for the binary word 11 corresponding to 270° by receiving signals at both inputs whenever a "1" bit is contained by both of the flip-flop circuits 48 and 46. Accordingly, each unique combination formed by the most significant two bits of successive three-bit data words will result in an output being provided from a single one of the AND gates 52, 54 and 56. Output signals from the AND gates 52, 54 and 56 thus respectively correspond to the phase modulation angles of 270°, 180° and 90° for the respective digital words "11", "10" and "01". When both the flip-flop circuits 46 and 48 contain "0" data bits corresponding to a 0 phase angle, obviously no phase angle need be added for a differential phase modulation procedure following the code of Table I.

A pair of OR gates 58 and 60 are connected to receive the outputs of the respective AND gates 52, 54 and 56 such that for a 90° phase angle an output signal will be provided by the OR gate 60, for a 180° phase angle an output signal will be provided by the OR gate 58, and for a phase angle of 270° output signals will be provided by both the OR gates 58 and 60.

As previously explained, where an eight-level coding scheme involving four phases and two amplitude levels is used, one of the bits of each three-bit binary word may be conveniently used to uniquely control or otherwise develop "high" and "low" amplitude levels as required.

As may be observed from the table shown by FIG. 3, the last or least significant bit in each three-bit half-group may serve as the bit that can conveniently be used to define whether a three-bit combination is to have a high or a low amplitude level. Very simply, if the least significant bit is a binary "0", a low amplitude level would be used. A binary "1" would then define that a high amplitude level be used such as with the binary words 001, 011, 101 and 111. Accordingly, the outputs of the flip-flop circuit 44 are connected to provide control signals to an amplitude modulator 62 which is connected to receive differentially phase modulated signals for transmission.

As earlier discussed, the data bits are outputted from the shift register 36 at a rate of 4800 bits per second. Accordingly, the three-bit half-groups are modulated at a baud rate of 1600. Sampling the contents of the flip-flop circuits 44, 46 and 48 occurs at such baud rate (1600Hz). A divide-by-three frequency divider circuit 64 may be used to divide the 4800Hz clock signal down to a desired 1600Hz clock signal for use in correctly timing and/or controlling the circuitry hereinafter described.

Ae earlier mentioned, an 800Hz signal as shown in FIG. 5 may be used to effect the addition of a 45° phase angle for every other half-group or, as illustrated by FIG. 5, with the occurrence of succeeding second half-groups. Thus, the 1600Hz signal provided by the divider 64 is further divided by a divider circuit 66 to provide an 800Hz signal. As shown by the square wave in FIG. 5, the positive half cycles may be used to represent a "high" signal and thereby cause a 45° phase angle to be added in the same manner that a "high" output from the OR gates 58 and 60 respectively cause 180° and 90° phase angles to be added.

As was earlier explained, differential phase modulation simply requires that a modulation phase angle be added to the phase angle of the last transmitted signals. To this end, the phase angle control signals provided from the OR gates 58 and 60 and from the divider circuit 66 are applied to a binary adder circuit 68 which receives from a storage register 70 signals representative of the phase angle of the last transmitted signals.

In the present example, since the angles of 45°, 90° and 180° are used, the adder circuit 68 and the storage register 70 should each accommodate three bits. The adder circuit 68 operates to binarily add a binary word representing a desired modulation phase angle to another binary word representing the phase angle of the last previously transmitted signal.

As an example, assume that the storage register 70 effectively includes three bit storage units 70a, 70b and 70c which respectively accommodate bits corresponding to 45°, 90° and 180° angles. If the phase angle of the last previously transmitted signal was 90°, then the storage register 70 would contain a "high" or binary "1" signal in the unit 70b while the units 70a and 70c would contain signals representative of binary "0's". Similarly, an angle of 135° would be accompanied by binary "1's" in the storage units 70a and 70b while the storage unit 70c would contain a binary "0". Since the same scheme is applicable to the output of the divider circuit 66 and the OR gates 60 and 58 in combination, a three bit binary word may be used to represent desired phase angles. Table II hereinbelow summarizes in tabular form exemplary three bit binary words applicable to different angles for both the storage register 70 and the outputs of the divider 66 and the OR gates 58 and 60. It is to be noted that the binary words have been written to have the least significant bit on the left to favorably compare with the illustrated positions of storage units of the storage register 70 and the adder circuit 69 wherein the smallest angle (45°) is accommodated to the left of increasingly larger angles.

TABLE II

THREE BIT BINARY WORDS* REPRESENTATIVE OF PHASE ANGLES FOR REGISTER 70 AND OUTPUTS OF DIVIDER 66, OR GATES 60 AND 58.

| Phase Angle | Reg. Unit 70a Div. 66 | Reg. Unit 70b OR gate 60 | Reg. Unit 70c OR gate 58 |
|---|---|---|---|
| 0 | 0 | 0 | 0 |
| 45° | 1 | 0 | 0 |
| 90° | 0 | 1 | 0 |
| 135° | 1 | 1 | 0 |
| 180° | 0 | 0 | 1 |
| 225° | 1 | 0 | 1 |
| 270° | 0 | 1 | 1 |
| 315° | 1 | 1 | 1 |

*most significant bit on right

Continuing the above example, a 90° angle would be stored in the register 70 as the binary word 010 and when added to a 180° phase angle in the form of the binary word 001, would produce the sum of 270° represented by the binary word 011. Similarly, a 135° angle stored in the register 70 as the binary word 110 when added to a 315° angle represented by the binary word 111 would produce the angular sum of 450° or 90° represented by the binary word 010.

Signals representative of sum angles are produced as output signals by the adder circuit 68 over a composite lead 72. Such sum signals obviously represent in binary form the required phase angle for transmitted signals and are thus provided to a logic circuit 74 which controls the operation of a phase shifting circuit 76.

The phase shifting circuit 76 may simply include three divider circuits 76a, 76b and 76c which are connected in series. The logic circuit 74 may then include three flip-flop circuits 74a, 74b and 74c which operate to toggle or inhibit operation of the corresponding divider circuit in the phase shifter 76 in response to the adder signals provided from the adder 68.

For example, if a 90° differential phase angle were required, the adder signals provided via the composite lead 72 would serve to have the logic flip-flop circuit 74b inhibit the divider 76b of the phase shifter 76. Similarly, a 270° differential phase angle would result in the logic flip-flop circuits 74b and 74c respectively inhibiting the phase shifter divider circuits 76b and 76c.

Obviously, the composite lead 72 may simply involve three leads which connect the three logic stages 74a, 74b and 74c to the three adder stages for 45°, 90° and 180° respectively.

A detailed discussion of the operation of the phase shifter 76 may be obtained by reference to U.S. Pat. No. 3,643,023 and is hence omitted herefrom. It is sufficient to herein point out that if the phase shifted carrier signal that is outputted by the phase shifting circuit 76 at an output lead 78 has a frequency of XHz, then an oscillator 80 would provide an output signal having a frequency of 8XHz to accommodate the three divider stages incorporated in the example.

A multivibrator circuit 82 which is connected to receive 1600Hz clock signals from the frequency divider circuit 64 operates to control the desired sampling rate of the flip-flop circuits 44, 46 and 48 by controlling the operation of the logic circuit 74. As may be readily understood, data bits are continually being provided to the flip-flop circuits 44, 46 and 48 and hence the angle signals provided to the adder circuit 68 from the OR gates 58 and 60 and the divider circuit 66 are continually changed in accordance with the changes in the contents of such flip-flop circuits 44, 46 and 48.

Synchronization of the operation of the logic circuit 74, phase shifter circuit 76, etc., with the digital data applied to the flip-flop circuits 44, 46 and 48 is accomplished by providing the output of the oscillator 80 as an enabling input to the multivibrator 82.

The differentially phase modulated signals provided at the output of the phase shifter circuit 78 are applied to the amplitude modulation circuit 62 to be amplitude modulated in accordance with the control signals applied thereto from the set (Q) and reset ($\bar{Q}$) outputs of the flip-flop circuit 44. A suitable amplitude modulator circuit is disclosed by U.S. Pat. No. 3,619,503. Accordingly, the signals outputted for transmission by the amplitude modulator would have a first amplitude level which may be designated as a low level when corresponding to any of the three-bit combinations such as 000, 010, 100 or 110 and a second amplitude level which may be designated as a high level when corresponding to any of the three-bit combinations including 001, 011, 101 and 111 as is summarized by Table and by FIG. 3.

A frequency translator circuit 83 receives the output of the amplitude modulator 62 and serves to convert or translate the high frequency signals, i.e., 20.9kHz, to a frequency that is suitable for transmission over telephone lines, i.e., 1700Hz.

It is now clear that the circuitry of FIG. 4 operates to multiplex and differentially phase modulate digital data bits provided from two independent data sources to allow unique identification of successive three-bit groups that are formed in the course of such modulation procedure such that transmitted data signals, upon receipt at a distant receiver, can be accurately demultiplexed, demodulated and distributed to utilization devices corresponding to the data sources from which the data was originally provided.

Turning now to FIG. 6, a circuit that is suitable for use as the demultiplexer-demodulator circuit 26 (FIG. 1) is illustrated. A demodulator circuit that generally incorporates the mode of operation of the present demultiplexer-demodulator circuit is described in detail in previously referred to U.S. Pat. Nos. 3,590,381 and 3,643,023.

Referring to FIG. 6, received signals transmitted through the equalizer 24, FIG. 1 are applied to the demodulator circuit at an input terminal 84. Such input signals are concurrently applied to a translator and squaring circuit 86 and to an amplitude level detector circuit 88. Exemplary input signals are generally illustrated by waveform A of FIG. 7.

The translator and squaring circuit 86 provides desired frequency translation to a predetermined high frequency, i.e., 20.9kHz from the low frequency signal that was required for telephone line transmission. Such frequency translation and squaring is accomplished in conjunction with clock signals provided from a high frequency oscillator circuit 90. A similar translator and squaring circuit is described in U.S. Pat. No. 3,643,023 and essentially operates to produce the desired frequency translation in a conventional manner. The translated frequency signals are then appropriately squared to be essentially the same in form as the signals that would have appeared at the output lead 78 of the phase shifter circuit 76 (FIG. 4). Waveform B of FIG. 7 generally illustrates a translated and squared output signal that may be produced by circuit 86.

The amplitude level detector circuit 88 operates to detect the amplitude level of received sinals. A suitable amplitude level detector circuit is described in detail in U.S. Pat. No. 3,619,503. Accordingly, a detailed description of such circuitry is omitted herefrom in the interest of brevity. The translated and squared data signals are applied concurrently to an AND gate 92 and to a derived clock and timing control circuit 94. A similar derived clock and timing control circuit suitable for use with the present invention is also described in Pat. Nos. 3,590,381 and 3,643,023. Such clock timing circuit 94 serves to provide a series of appropriate timing signals (waveforms C, E, F and G, FIG. 7), which serve to timely enable the various elements hereinafter described via a series of leads 96, 98, 100 and 102. For example, any conventional circuit such as a counter or the like may be used as a clock circuit 94.

A free-running binary counter 104 is operated in accordance with the high frequency signals applied thereto from the oscillator 90. The binary counter 104 essentially involves a plurality of stages of which the stages 104a, 104b, 104c and 104d provide at outputs thereof the customary bilevel signals in accordance with the count thereof. Other counter stages, not shown, are included to enable the addition and/or subtraction of smaller angular increments. The respective counter stages 104a-104d may be corresponded to phase angles 22.5°, 45°, 90° and 180°, respectively. Thus, assuming that a counter is initialized or commenced at "0", the output signals provided by the counter stages would repetitively advance through the possible different binary words, i.e., 0000, 1000, 0100, 1100, 0010, etc. at a rate generally controlled by the oscillator 90. The output of the counter 104 is adapted to be advanced or retarded by a predetermined angle or amount to phase-lock the counter 104 to the received intermediate frequency (IF) data signals applied to the input gate 92 and to 45° phase angle additions occurring at the modulator 10 of the transmitter.

It is to be noted that the most significant bit of the binary words outputted by the combined stages of the counter 104 has been written as the rightmost bit to correspond to the illustration of FIG. 3. Hence the most significant bit corresponds to the stage 104d for a phase angle of 180°.

The counter 104 is phase-locked to the received IF data signals provided at the output of the translator and squaring circuit 86 to have the "0" crossing or transition of the received IF data signals occur at an odd multiple of 45° in the phase angle or value of the output of the binary counter. Since data was originally differentially phase modulated in increments of 90° at the modulator 10, the outputs of the stage 104c and 104d would represent the differential phase angles to be demodulated provided that the 45° angle additions are otherwise cancelled out. Hence, the counter may be initialized by writing a binary "1" into the stage 104b. This, in effect, initiates the counter reading at 45° which would be the first odd multiple of 45°. The value of the 45° stage of the counter 104 is thereafter interrogated at a time coincident with the first level state transition (waveform H, FIG. 7) of the data pulses during each sampling period. The interrogation is effected by a read counter pulse (waveform D, FIG. 7) which is emitted by the input AND gate 92 and applied to an add/subtract circuit 106 as well as to registers 108 and 110 and a binary subtractor circuit 112 as is hereinafter explained. If a "1" appears in stage 104b, the add/subtract circuit 106 functions to subtract an incremental angle, i.e., 2.8° from the counter reading. If a "0" appears at the output of the stage 104b, the add/subtract circuit 106 functions to add such incremental angle to the counter reading. A similar add/subtract circuit is described in U.S. Pat. No. 3,590,038. The counter 104 is accordingly phase-locked to have the IF data signal transitions generally centered on the half-cycle periods for the 90° signal, as shown by waveforms M and N of FIG. 8, for as long as the receiver is in otherwise proper phase with the transmitter. Such phase-locked relationship, of course, requires that the receiver operate to synchronously add the same 45° phase angles that are continually being added at the transmitter to effectively cancel out such 45° phase addition and thereby facilitate the differential phase modulation procedure. Such 45° phase additions are automatically carried out and maintained at the receiver in a manner to be hereinafter described.

As may be readily appreciated, the differential phase demodulation procedure simply requires that the phase and amplitude of received signals be detected and decoded. The amplitude detection as previously mentioned is performed by the detector circuit 88. The phase demodulation is carried out by comparing the phase of the last previously received signals with the phase of presently received signals to determine any phase difference. Such phase comparison is accomplished by having a binary word corresponding to the phase of presently received signals applied to a bit register 108 from the counter 104. A binary word corresponding to the phase of the last previously received signals is maintained in a bit register 110 by being applied thereto from the bit register 108.

The respective binary words in the registers 108 and 110 are applied to a binary subtractor circuit 112 to be subtracted to determine any difference in phase between the last previously received signals and the presently received signals. The binary subtractor 112 may operate to produce a typical binary output including bits, in this case two bits, which combine to represent the different phase angles possible and hence represent the phase difference between the received signals and the last previously received signals. The demodulated signals representative of such angular or phase difference are outputted by the subtractor circuit 112 at a pair of output leads 114 and 116 which may respectively correspond to 90° and 180°. Accordingly, if the angular difference were 270° then a binary "1" would be present at both the leads 114 and 116. Similarly, a phase angle that is a multiple of 360° would result in binary "0's" appearing at both of the leads 114 and 116.

Timing of the operation of the subtractor circuit 112 and registers 108 and 110 is accomplished as earlier mentioned in accordance with timing signals provided by the timing control circuit 84.

A decoding circuit 118 is connected to receive as inputs the output signals provided by the amplitude level detector circuit 88 and the subtractor circuit 112. The decoding circuit 118 would be formed by any combination of logic gates or the like that would suitably provide the three binary bits corresponding to the code used, i.e., see Table I. Such combinations of logic gates are, of course, well known and could be readily fashioned by any person of ordinary skill in the art. An arrangement of gates that is the inverse of the gates 52, 54, 56, 58 and 60 of the modulator 10 may be used.

As an example, if the subtraction performed by the subtraction circuit 112 resulted in a difference angle of 180°, a signal representing a binary "1" would appear at the output lead 116 while a signal representing a binary "0" would appear at the output lead 114. Taken in conjunction with the detected amplitude level signal from the level detector circuit 88, the particular groups of bits that were transmitted would be determined in accordance with the code used, i.e., if the amplitude level were high, then the bits 101 would have been decoded.

Such binary bits represent the result of the differential phase demodulation procedure and may be transferred to a three-bit buffer register 120 via a transfer gate 122 under the control of timing signals provided by the clock timing control circuit 94.

Using the earlier described sequence of bits, proper demultiplexing is needed to identify decoded bits provided to the register 120 as either bits $A_1$, $B_1$, $A_2$ or bits $B_2$, $A_3$, $B_3$ which respectively form the first and second half-groups. When such bits represent the first half-group, a first transfer gate 124 is enabled to transfer the bits to an output register 126 or the like. The bits which form the second half-group are transferred to the output register 126 through a gate 128 when enabled. The output register 126 transfers bits to the utilization devices 28 and 30 under the control of signals from the timing control circuit 94.

As shown, the bits stored in the register 120 are concurrently provided to both of the transfer gates 124 and 128. The desired transfer is effected by having the transfer gates 124 and 128 alternately enabled at the same rate used at the transmitter, i.e., 800Hz. For example, the selective enabling of the gates 124 and 128 may be accomplished by simply applying as inputs thereto an 800Hz signal that is developed in a manner hereinafter explained. In the embodiment shown by FIG. 6, the gate 128 will be enabled on the positive half-cycles and the gate 124 will be enabled on the negative half-cycles in the manner described in conjunction with FIGS. 4 and 5. An inverter circuit 134 may be used to properly invert the negative half-cycles for enabling the gate 124.

As previously mentioned, the addition of a 45° phase angle for every other three bit half-group is performed at the receiver to compensate for the 45° phase additions that are made in the modulator 10 at the transmitter. This matching 45° angle addition in the receiver effectively operates to cancel out the same 45° phase angle addition at the transmitter. Clearly, if the selected angle modification were to be a 45° angle subtraction at the transmitter, then the angle subtraction would be duplicated at the receiver.

Figure 8:
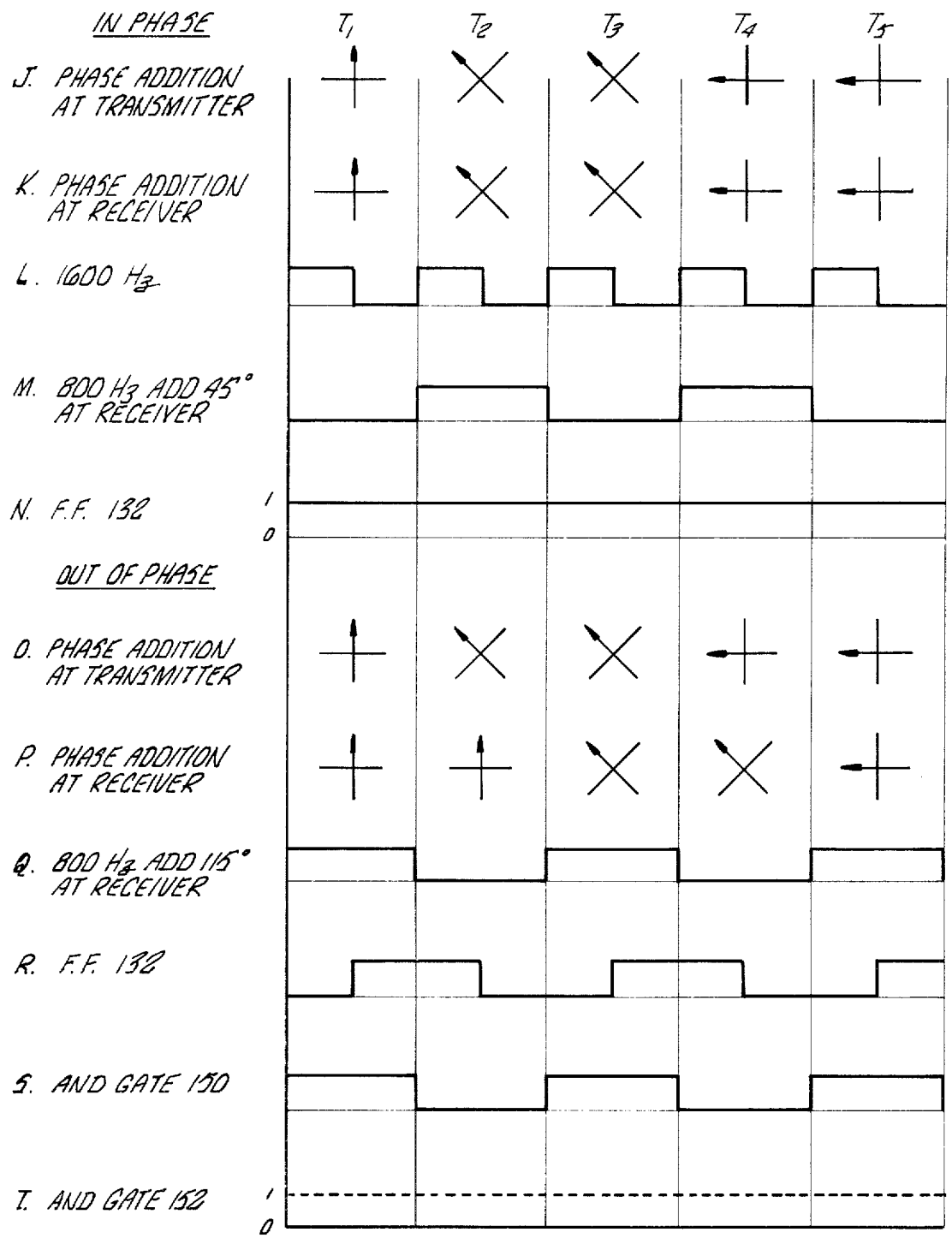
FIG. 8 is a graphic diagram illustrating a number of waveforms that are useful in understanding the effect of the 45° phase angle additions according to the invention when in-phase and out-of-phase.

Referring to FIG. 8, diagrams J and K are intended to illustrate properly matching phase angle additions at the transmitter and receiver of distant modems. As shown by such diagrams, a phase angle addition occurs in periods $T_2$ and $T_4$ relative to the respective phase angles existing in periods $T_1$ and $T_3$, respectively. By contrast, diagrams O and P of FIG. 8 illustrate 45° phase angle additions that are out-of-phase. Where diagram O represents the angle additions at the transmitter, and diagram P represents the angle additions at the receiver, it can be seen that the 45° phase angle addition at the receiver lags the transmitter by one time period. This would be the case whenever the respective 800Hz signals used at the modulator and demodulator for making such 45° angle additions are exactly out-of-phase. Assume that the waveform M, which illustrates an 800Hz signal that is used to effect desired 45° phase angle additions, is properly phased with the transmitter operation. Then the 800Hz signal shown by waveform Q would be out-of-phase. It may be noted from the diagrams O and P that when such out-of-phase conditions exist, every other time period, i.e., $T_1$, $T_3$ and $T_5$, is effectively in-phase while in the intervening time periods, $T_2$ and $T_4$, an out-of-phase condition exists.

During such periods, $T_2$ and $T_4$, the differential phase angle detected at the receiver improperly lags by 45° in the specific embodiment being described. As a consequence, the output of the exclusive OR gate 130, to which outputs from stages 104a and 104b of the waveform 104 is applied, will be effectively undesireably shifted with respect to the output of the AND gate 92 in the periods $T_2$, $T_4$, et seq. When the output of the AND gate 92 is used to clock a flip-flop circuit 132 and the output of the exclusive OR gate 130 is applied to set the flip-flop circuit 132, an in-phase condition will be characterized by a continuous "high" output from the flip-flop circuits 132 as is shown by waveform N of FIG. 8. On the other hand, the flip-flop circuit 132 will be controlled to alternately change to a "low" state when an out-of-phase condition exists as illustrated by waveform R of FIG. 8. Such changes may be recognized as a series of binary "1's" and "0's". Thus the output of the flip-flop circuit 132 will be a series of binary "1's" and "0's" for an out-of-phase condition. The constant "high" state exhibited by the flip-flop circuit 132 when the 45° angle addition is in-phase at the receiver and transmitter may then be recognized as a continuing series of binary "1's" as shown by waveform N of FIG. 8.

This unique alternating sequence of binary "1's" and "0's" which exists for an out-of-phase condition may thus be readily detected in accordance with the present invention to cause a phase correction. After a predetermined period, i.e., eight successive "10" binary combinations, the out-of-phase condition may be considered as ascertained and may be corrected by simply inverting the 800Hz signal used as a means for effecting the 45° phase angle additions at the receiver (compare waveforms M and Q of FIG. 8).

Referring once again to FIG. 6, it may be observed that an add 45° angle control circuit 140 is connected to effect desired 45° phase angle additions at the receiver by simply advancing the counter 104. Such add circuit 140 would simply effect an advance of the count for the 45° stage 104b of the counter 104. An add circuit 140 may be essentially the same as the add/subtract circuit 106 except that no subtraction would be required. Clearly, any well known method for performing such functions may be used, i.e., using a one-shot, flip-flop, etc.

Such add 45° circuit 140 is connected to be clocked by an 800Hz signal such as illustrated by waveform M of FIG. 8. The 800 Hz clock signal may be provided at the output of an exclusive OR gate 142 which has its inputs respectively connected to a pair of flip-flop circuits 144 and 146. As shown by FIG. 6, this same 800Hz clock signal may also be applied to control the gates 124 and 128.

The flip-flop circuit 144, as shown, is clocked by a 1600Hz signal from a conventional source (not shown) and effectively serves as a divider by providing an 800Hz output at the set or "1" output thereof. The flip-flop circuit 146 on the other hand remains in either a "1" or a "0" state until clocked by the output of a counter 148 which is connected to count a predetermined number of alternating "1" and "0" bits provided from the output of the flip-flop circuit 132. Any suitable counter well known in the art may be used as the counter 148.

As shown, the counter 148 is connected to receive input pulses to be counted from an AND gate 150 and be reset by an output from an AND gate 152. The AND gate 150 may simply be connected to receive required inputs from a pair of series connected flip-flop circuits 154 and 156 whenever a binary "1" bit and "0" bit are successively received from the flip-flop circuits 132. As shown, the flip-flop circuits 154 and 156 may be clocked by a 1600Hz signal such as is illustrated by waveform L of FIG. 8. Waveform S would then illustrate the train of pulses that would be outputted from the AND gate 150 to be counted by the counter 148. Any two successive binary "1" bits will cause the AND gate 152 to reset the counter 148. However, when a continuing series of binary "1's" and "0's" for an out-of-phase condition is experienced, the AND gate 152 will provide no such reset signal to the counter 148 as is shown by waveform T of FIG. 8.

The counter 148 may be set to provide an output to the flip-flop circuit 146 upon any selected count being reached.

Any other conventional logic scheme obviously may be used to accomplish the desired recognition of a sequence of binary "1's" and "0's" which in this case, indicates that the phase angle addition at the transmitter and receiver are out-of-phase.

Figure 9:
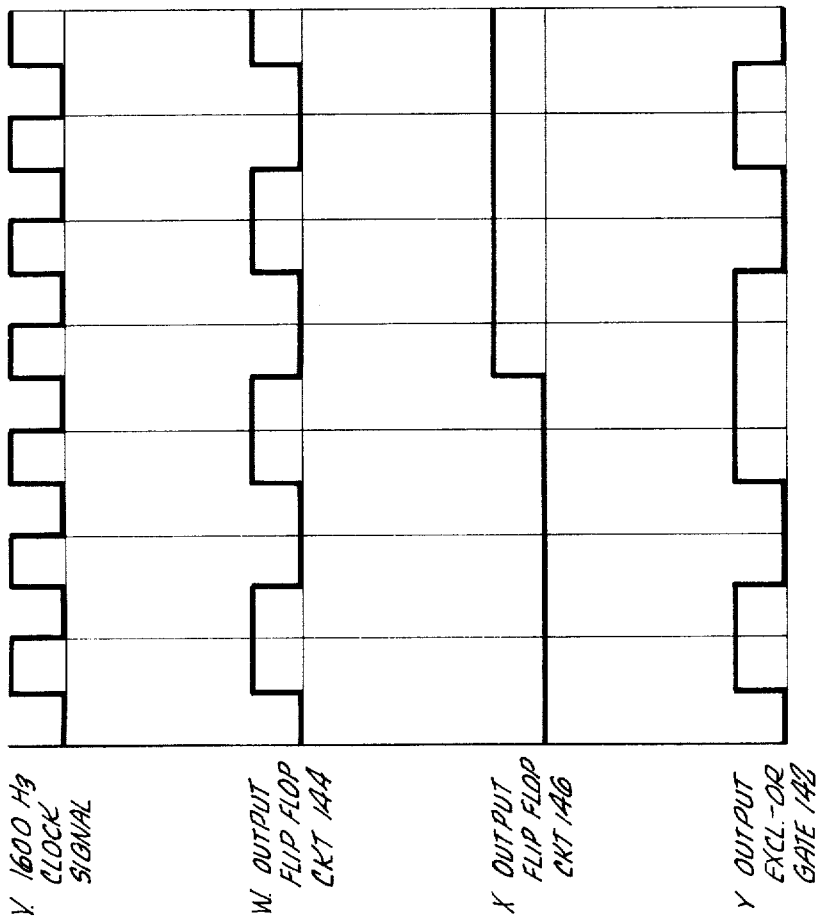
FIG. 9 is a graphic diagram illustrating a number of waveforms that are useful in understanding the phase correction accomplished by operation of essentially the elements 142, 144, 146 and 148 of FIG. 6.

The waveforms of FIG. 9 illustrate the operation of the counter 148 in conjunction with the flip-flop circuits 144 and 146 and the exclusive OR gate 142. Waveform V illustrates a typical 1600Hz clock signal which may be provided to clock the flip-flop circuit 144. The output of the flip-flop circuit 144 may thus be represented by the waveform W wherein the flip-flop circuit 144 is successively set and then reset by each succeeding pulse of the 1600Hz clock signal. If it is assumed that the flip-flop circuit 146 is in a reset state, the output thereof may then be represented as a constant low level signal, in a time period $t_o$–$t_1$ as shown by waveform X. If at time $t_1$ the counter 148 has counted the predetermined number of successive binary "0" and "1" bits, then, as shown, the output of the flip-flop circuit 146 would assume a high level in conformance with a set state. The result is that the output of the exclusive OR circuit 142, if high, as shown by waveform Y, would remain high for one cycle of the 1600Hz clock signal to effectively invert the 800Hz output of the exclusive OR gate 142 and thereby effectively cause the addition of 45° phase angles to be advanced and become in-phase with the transmitter operation.

It is to be again noted that although the above-discussed exemplary embodiment of the invention has been described in conjunction with 45° phase angle additions, that the intended objective may be generalized by observing that such phase angle addition and/or subtraction need simply be capable of uniquely identifying every other group of three data bits which are modulated for transmission. As an example, for an eight-level differential phase modulation scheme involving eight phases which are multiples of 45°, rather than 90° as with the above-discussed four phase/two level format, 22.5° phase angle additions and/or subtractions may be used at the transmitter and receiver.

From the foregoing discussion it is now clear that the present invention provides a modem that will operate to transmit and receive data bits from two independent data systems by the use of multiplexing and modulation technique that permits data bits from two different systems to be mixed to effectively form groups of thre bits for differential phase modulation purposes wherein alternate ones of such groups are uniquely identified by a predetermined phase angle addition at the transmitter, which added phase angle is effectively duplicated and thereby removed at the receiver in phase with received data to permit demodulation, demultiplexing and distribution of the received data.

The disclosures of the four referenced patents are intended to be incorporated herein by reference as is necessary to provide a detailed description of the various components described for use in conjunction with the present invention.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A data transmission system having a transmitter for transmitting data over a single transmission link as a differentially phase modulated carrier modulated at a given baud rate with digital data provided from two independent data sources each emitting data bits at one and one half times said baud rate, and a receiver for demodulating the differentially phase modulated signal received over said link, the improvement which comprises:

means at said transmitter operative at said given baud rate for differentially phase modulating successive three bit groups with bits in each group received from both of said independent data sources;

means at said transmitter connected to said modulating means and operative once for every other three bit group for modifying by a predetermined phase angle the differentially modulated phase angle associated with successive three bit groups, which modifying angle is capable of being detected at the receiver to properly segregate each three bit group from an otherwise randomly appearing stream of data bits represented in the received line signal;

means at said receiver for compensating, once each alternate baud time, the differentially phased signal received over said link with a predetermined modifying angle of the same amount as used at the transmitter; and means at said receiver responsive to the appearance of said predetermined modifying angle during demodulation for segregating said three bit groups into the form originally emitted by the two data sources at said transmitter.

2. The system defined by claim 1 wherein said angle modifying means emits a predetermined phase angle equal to $\Delta\theta/2$ where $\Delta\theta$ is equal to the phase angle multiple employed by said differential phase modulating means.

3. The system defined by claim 1 wherein said transmitter further includes multiplexing means for combining in a predetermined order data bits from said two independent data sources, said order being repetitive for each group of six successive bits received from said data sources.

4. The system defined by claim 3, said multiplexing means including a data bit register having a bit capacity that is at least equal to the number of bits in each group of bits that is repeated in accordance with said order.

5. The system defined by claim 3, said multiplexing means including:
first buffer means for receiving data bits from a first one of said independent data sources;
second buffer means for receiving data bits from a second one of said independent data sources;
shift register means for providing a stream of data bits in accordance with said order wherein successive groups of three bits are applied to said modulating means to be differentially phase modulated; and
means connected to said first and second buffer means for periodically providing data bits from said two independent data sources to said shift register means.

6. The system defined by claim 1, wherein said modulating means comprises:
input means for receiving successively applied data bits in groups of three bits, said input means having output terminals at which a first or second binary data level is indicated for each data bit in each group of three bits;
encoding means connected to said input means for sensing the binary data level for at least two of the data bits in each group of three bits, said encoding means providing encoded signals which are useable to control the modulation phase angles to be used for the group of data bits whose binary data level is sensed;
said phase modifying means providing a control signal to be used in combination with said encoded output signals to control the modulation phase angle for transmitted data signals wherein the modulation phase angle for transmitted differentially phase modulated signals corresponding to alternate groups of three bits is changed by said predetermined modifying phase angle; and output means connected to receive said encoded output signals from said encoding means and said control signal from said phase modifying means for providing in response to said encoded signals and said control signal differentially phase modulated signals for transmission.

7. The system defined by claim 6, said input means including a plurality of bistable devices each having first and second states respectively corresponding to one of said binary data levels of said bits, each said bistable device assuming the one of said states that corresponds to the binary data level of the data bit last applied thereto, said bistable devices each having output terminals at which signals indicative of the binary data level of each successive group of the bits are provided.

8. The system defined by claim 6, said encoding means including logic gates for providing said encoded signals in accordance with a code used in conjunction with said differential phase modulation.

9. The system defined by claim 6, said phase modifying means including means for providing as said control signal a signal having a frequency of $f/6$ wherein $f$ is equal to twice the data rate of said two independent data sources wherein said data rate is the same for both independent data sources.

10. The system defined by claim 6, said output means including:
oscillating means providing an oscillator signal having a constant frequency; and
phasing means for adjusting the phase of said oscillator signal in accordance with said encoded signals from said encoding means and said control signal from said phase modifying means, said phasing means providing said differentially phase modulated signals.

11. The system defined by claim 10, wherein said output means at said transmitter further includes amplitude modulation means, connected to said phasing means, for controlling the amplitude of said differentially phase modulated signals in accordance with the binary data level of a selected one of the bits included in each group of three bits.

12. The system defined by claim 6, wherein:
said input means includes a plurality of bistable devices each having first and second states respectively corresponding to one of said binary data levels of said bits, each said bistable device assuming the one of said states that corresponds to the binary data level of the data bit last applied thereto, said bistable devices each having output terminals at which signals indicative of the binary data level of each successive group of three bits are provided;
said encoding means includes logic gates for providing said encoded signals in accordance with a code used in conjunction with said differential phase modulation;
said phase modifying means includes means for providing as said control signal a cyclical signal having a frequency of $f/6$ wherein $f$ is equal to twice the data rate of said two independent data sources wherein said data rate is the same for both independent data sources; and
said output means includes oscillating means for providing an oscillator signal having a constant frequency, and phasing means for adjusting the phase of said oscillator signal in accordance with said encoded signals from said encoding means and said control signal from said phase modifying means, said phasing means providing said differentially phase modulated signals.

13. The system defined by claim 1, and further comprising demodulating means at said receiver, said demodulating means including;
   phase sensing means for detecting the phase of received differentially phase modulated signals;
   storage means connected to said phase sensing means for storing signals representative of the phase of last previously received differentially phase modulated signals; and
   difference means connected to said phase sensing means and said storage means for determining the difference between the phase of a presently received differentially phase modulated signal and the phase of said last previously received differentially phase modulated signal.

14. The system defined by claim 13, said demodulating means further including decoding means connected to receive said differential phase signals from said difference, for determining the binary value of said group of three data bits.

15. The system defined by claim 13, said demodulating means further including amplitude detecting means for detecting the amplitude level of received differentially phase modulated signals being demodulated, said amplitude detecting means providing an amplitude level signal.

16. The system defined by claim 15, said demodulating means further including decoding means connected to receive said differential phase signals from said difference means and said amplitude level signal from said amplitude detecting means for determining the binary value of said group of three data bits.

17. The system defined by claim 14, said phase sensing means including:
   a binary counter for providing counter signals indicative of the phase of received differentially phase modulated signals when said binary counter is sampled; and
   sampling means for controlling said binary counter to be timely sampled to have outputted counter signals be indicative of the phase of received differentially phase modulated signals.

18. The system defined by claim 17 and wherein:
   said angle compensating means further comprises means connected to compensate said binary counter by advancing said counter by an amount corresponding to said predetermined modifying phase angle for every alternate group of three bits;
   said demodulating means further including gating detector means for emitting a first gating detector signals when said angle compensating means adds the modifying angle to the proper alternate three bith groups and for emitting a second gating detector signal when said angle compensating means adds the modifying angle to the improper alternate three bit groups.

19. The system defined by claim 18, wherein said gating detector means is an exclusive OR gate having its inputs connected to receive said preselected counter signals, said first and second series of gating detector signals being provided at an output terminal of said exclusive OR gate.

20. The system defined by claim 18, said angle compensating means including:
   means for providing a clock signal having a cyclic frequency equal to one-third the data rate of each said independent data sources;
   phase adder means for applying an advance signal to said binary counter to advance said binary counter by an amount corresponding to said predetermined phase angle, said phase adder means providing an adder signal having a cyclic frequency equal to one-third the data rate of said independent sources in response to and in-phase with said clock signal;
   series detector means connected to said gating detector means for detecting said second series of gating detector signals, said series detector providing a reversal signal after a predetermined number of gating detector signals in said second series have been received consecutively; and
   reversal means responsive to said reversal signal from said series detector means for causing said clock signal to be inverted.

21. The system defined by claim 20, said series detector means including a resettable counter that is adapted to be advanced in response to gating detector signals in said second series and be reset in response to gating detector signals in said first series, said second series including binary signals that are alternately representative of a binary "1" and a binary "0", said resettable counter providing said reversal signal upon attaining a predetermined count.

22. The system defined by claim 17 further including demultiplexing means responsive to said clock signals for enabling the distribution of data bits provided from said decoding means to the data utilization terminals corresponding to the data sources from which the data bits originated.

23. The system defined by claim 22 wherein said demultiplexing means includes:
   first and second transfer means which are connected to be alternately operated to transfer data bits therethrough under the control of said clock signals; and
   output register means for providing data bits received from said first and second transfer means to said data utilization terminals.

* * * * *

UNITED STATES PATENT AND TRADEMARK OFFICE
CERTIFICATE OF CORRECTION

PATENT NO. : 3,943,285

DATED : March 9, 1976

INVENTOR(S) : Robert G. Ragsdale and Henry H. Parrish

It is certified that error appears in the above-identified patent and that said Letters Patent are hereby corrected as shown below:

Column 9, line 23, delete "69" and insert --68--.

Column 10, line 45, delete "Table" and insert --Table I--.

Column 11, line 25, delete "sinals" and insert --signals--.

Column 16, line 30, delete "thre" and insert --three--.

Column 19, line 22, insert --means-- after "difference".

Signed and Sealed this

Seventh Day of September 1976

[SEAL]

Attest:

RUTH C. MASON
*Attesting Officer*

C. MARSHALL DANN
*Commissioner of Patents and Trademarks*